United States Patent
Deakin (10) Patent No.: US 6,736,300 B2
(45) Date of Patent: May 18, 2004

(54) VEHICLE ROOF RACK KIT

(76) Inventor: Ray Deakin, 142 Krieghoff Ave., Markham, Ontario (CA), L3R 1W1

(*) Notice: Subject to any disclaimer, the term of this patent is extended or adjusted under 35 U.S.C. 154(b) by 130 days.

(21) Appl. No.: 10/100,132

(22) Filed: Mar. 19, 2002

(65) Prior Publication Data

US 2003/0178456 A1 Sep. 25, 2003

(51) Int. Cl.$^7$ ................................. B60R 9/048
(52) U.S. Cl. ................................. 224/319; 224/315
(58) Field of Search ............................. 224/315, 317, 224/319, 324, 558, 569, 571, 405

(56) References Cited

U.S. PATENT DOCUMENTS

| | | | |
|---|---|---|---|
| 2,134,823 A | 11/1938 | Stephan et al. | |
| 2,615,667 A | 10/1952 | Smith et al. | |
| 2,746,628 A | 5/1956 | Neyra | |
| 2,946,397 A | 7/1960 | Berberich | |
| 3,672,612 A | 6/1972 | Laing | |
| 3,722,766 A | 3/1973 | Barrineau et al. | |
| 3,877,624 A | 4/1975 | Carson | |
| 3,888,398 A | 6/1975 | Payne | |
| 3,893,568 A | * 7/1975 | Lile | 211/49.1 |
| 3,904,094 A | 9/1975 | Correll | |
| 4,009,853 A | * 3/1977 | Lile | 248/201 |
| 4,170,331 A | 10/1979 | Faulstich | |
| 4,262,834 A | 4/1981 | Nutt | |
| 4,390,117 A | 6/1983 | Fagan | |
| 4,618,083 A | 10/1986 | Weger | |
| 4,827,742 A | * 5/1989 | McDonald | 70/19 |
| 5,009,350 A | * 4/1991 | Schill et al. | 224/324 |
| 5,186,588 A | * 2/1993 | Sutton et al. | 410/120 |
| 5,435,473 A | * 7/1995 | Larkum | 224/569 |
| 5,651,484 A | 7/1997 | Fugman | |
| 5,878,929 A | * 3/1999 | Leonard | 224/401 |
| 5,918,488 A | * 7/1999 | Deeter | 70/14 |
| 6,142,349 A | * 11/2000 | Roberson | 224/401 |
| 6,290,113 B1 | * 9/2001 | Plyler | 224/315 |
| 6,394,327 B1 | * 5/2002 | Mietlicki | 224/547 |
| 6,397,644 B1 | * 6/2002 | Gidding | 70/18 |

* cited by examiner

Primary Examiner—Stephen K. Cronin (57) ABSTRACT

In a vehicle roof rack kit a plurality of releasable identical carrier assemblies adapted for securing an object there within and further comprising releasable attaching means for attaching each assembly to the mounting members of a vehicle roof rack. The assemblies comprise a channel-shaped carrier. The sides of the carrier have opposing apertures for receiving a rod for holding an object within the carrier. The rod may be locked into place. Alternatively, a shackle and locking body combination may be used to lock the object within the carrier.

5 Claims, 10 Drawing Sheets

VEHICLE ROOF RACK KIT

CROSS-REFERENCE TO RELATED APPLICATIONS

Not Applicable.

BACKGROUND

1. Field of the Invention

This invention relates to article carriers and more specifically to a vehicle roof rack kit that permits the carriage of articles such as ladders.

2. Description of the Prior Art

Article carriers that mount to the top of automobiles and trucks are well known. These carriers are adapted to carry a wide variety of cargos. A very common article that is carried on the top of cars and utility vehicles is the ladder. The extreme length of a ladder, its narrowness and its thin profile creates a challenge to a conventional roof mounted vehicle carrying rack. The ladder must be secured to prevent movement that could damage the ladder as well as create a safety hazard. A number of solutions have been proposed to secure ladders to the roof of cars and other vehicles. One such solution is described in U.S. Pat. No. 3,672,612 "Ladder Latching Device" issued to Clyde A. Laing, Jr. on Jun. 27, 1972. Laing teaches a latching device for securing a ladder to a vehicle having a rack attached to it. The latching device is secured to the ladder and comprises a rotatable shaft secured to the side rails of the ladder. The shaft has a handle mounted to it that can be secured to the side rail of the ladder by means of a hook. A pivoting arm is attached to the centre of the rotating shaft and a hook is attached to the arm. The hook is engaged with the cross member of the rack and the action of rotating the handle to its locked position has the result of pressing the hooked cross member and the ladder into a tightly fixed relationship.

Another example of a known ladder rack is found in U.S. Pat. No. 4,390,117 "Ladder Rack for Vehicle" issued to Fagan on Jun. 28, 1983. Fagan teaches a ladder rack for a vehicle roof comprising a plurality of front and rear ladder support assembly pairs. Each pair of assemblies is adapted to support the front and rear portions of a ladder by releasable engagement of the ladder stringers or rungs.

Another example of known ladder racks is found in U.S. Pat. No. 4,618,083 "Ladder Clamping Device for Vehicle Rack" issued to Weger on Oct. 21, 1986. Weger teaches a device comprising front framing members that hold a selected front rung of the ladder in position and a rear clamping mechanism to downwardly engage a selected rear rung of the ladder.

The above-cited and heretofore known ladder rack devices share a number of disadvantages:

1. The previously known ladder racks require the use of a plurality of interacting parts thereby increasing the complexity of operation of the device, its cost of manufacture and its proneness to mechanical failure.
2. These racks require the use of forces against either the ladder rung members or the cross members of the vehicle rack making such members vulnerable to plastic deformation.
3. The known racks are difficult to produce as a kit because of the large number of parts and complex design they employ. Such a kit would be expensive to purchase and more than likely not suitable to casual use by the occasional user.
4. The known racks require different attaching devices for the front and rear portions of the ladder. This lack of uniformity leads to expensive manufacturing.

Therefore there is a continued need for a ladder holding device for a vehicle rack that is simple to use and inexpensive to make. There is further a need for a ladder rack that does not unnecessarily stress ladder components or those of the automobile rack.

SUMMARY OF THE INVENTION

In accordance with the present invention there is provided a vehicle roof rack kit suitable for carrying a ladder and like objects. The kit comprises a plurality of identical assemblies. Generally there must be at least two assemblies to secure the front and the back of the ladder, however, more may be used if desired. These assemblies are adapted for securing an object to said assemblies and are releasably attached to the cross members of the roof rack.

In accordance with another embodiment of the invention each assembly comprises a carrier for receiving and releasably holding an object. Securing means is provided to secure the object within said carrier. The object may be locked into the carrier. Means are also provided to mount the carrier assemblies to the roof racks.

In yet another embodiment of my invention, the carrier is adapted to receive and hold an object. The carrier is channel shaped having two opposing parallel and vertical side members in a spaced apart relationship and a flat bottom member. The sides are apertured to receive securing means said apertures located in positional agreement to each other in the top portion of each side member. The securing means comprises a rod having a first end and a second end. Only the first end is insertable into the apertures. The rod has a diameter slightly smaller than that of the apertures.

In still another embodiment of my invention there is included a resilient bushing member having a top surface and a bottom surface insertable engaged in a tight sliding relationship with the parallel side members of the carrier so that the bottom surface of the bushing abuts in frictional engagement the top surface of the object being held within the carrier. The top surface of the bushing abuts in pressed engagement against the bottom surface of the inserted rod the result being that significant lateral and vertical vibrations of the object within the carrier are dampened when the vehicle is moving thereby preventing damage to the object. The bushing may also be bored with a plurality of bores passing through the bushing so that when the bushing is inserted between the vertical side members of the carrier the bores of the bushing are in alignment with the apertures in the vertical side members of the carrier the result being that the rod may be inserted between the vertical side members and through the bushing thereby keeping the bushing is a secure abutting relationship with the object within the carrier.

In another embodiment of my invention, the carriage assemblies are fastened to the vehicle rack cross members using a shackle bolt. The threaded ends of the bolt are received by a pair of apertures in the bottom member of the carrier. The threaded ends of the bolt are adapted to receive a nut and lock washer combination.

OBJECTS AND ADVANTAGES OF THE INVENTION

Accordingly, some objects and advantages of my invention are:

1. to provide a simple device that can be used with existing vehicle roof racks to secure objects;

2. to provide an auto rack kit for carrying a ladder that is easy to use and inexpensive to manufacture;
3. to provide an auto rack kit that does not apply deforming stresses to the structural members of a ladder or to the cross members of the vehicle rack; and,
4. to provide an auto rack that is securely lockable.

Further objects and advantages of my invention will become apparent from a consideration of the following detailed description and drawings.

REFERENCE NUMBERS IN THE DRAWINGS

| 8 | Roof rack |
|---|---|
| 10 | Front mounting member |
| 12 | Rear mounting member |
| 14 | Rack side member |
| 16 | Rack side member |
| 18 | Vehicle roof |
| 20 | Vehicle |
| 22 | Ladder |
| 24 | Assembly |
| 26 | |
| 28 | |
| 30 | Carrier |
| 32 | Securing means |
| 33 | Locking means |
| 34 | |
| 36 | Carrier side member |
| 38 | Carrier side member |
| 40 | Carrier bottom member |
| 42 | Open carrier end |
| 44 | Aperture |
| 46 | |
| 48 | |
| 50 | Rod |
| 52 | Rod first end |
| 54 | Rod second end |
| 56 | Rod first end aperture |
| 58 | Pin |
| 60 | Temporary stop means |
| 62 | Permanent stop means |
| 64 | |
| 66 | |
| 68 | |
| 70 | Bushing |
| 72 | Top of bushing |
| 74 | Bottom of bushing |
| 76 | Top of object carried |
| 78 | Bushing bore |
| 80 | Locking body |
| 81 | |
| 82 | Shakle |
| 84 | |
| 86 | |
| 88 | |
| 90 | Locking body |
| 92 | Shackle |
| 94 | Shackle arm |
| 96 | Locking Plate |
| 98 | |
| 100 | Attachment means |
| 102 | Apertures |
| 104 | Shackle |
| 106 | Thread |
| 108 | Nut and washer |

DETAILED DESCRIPTION

Figure 1:
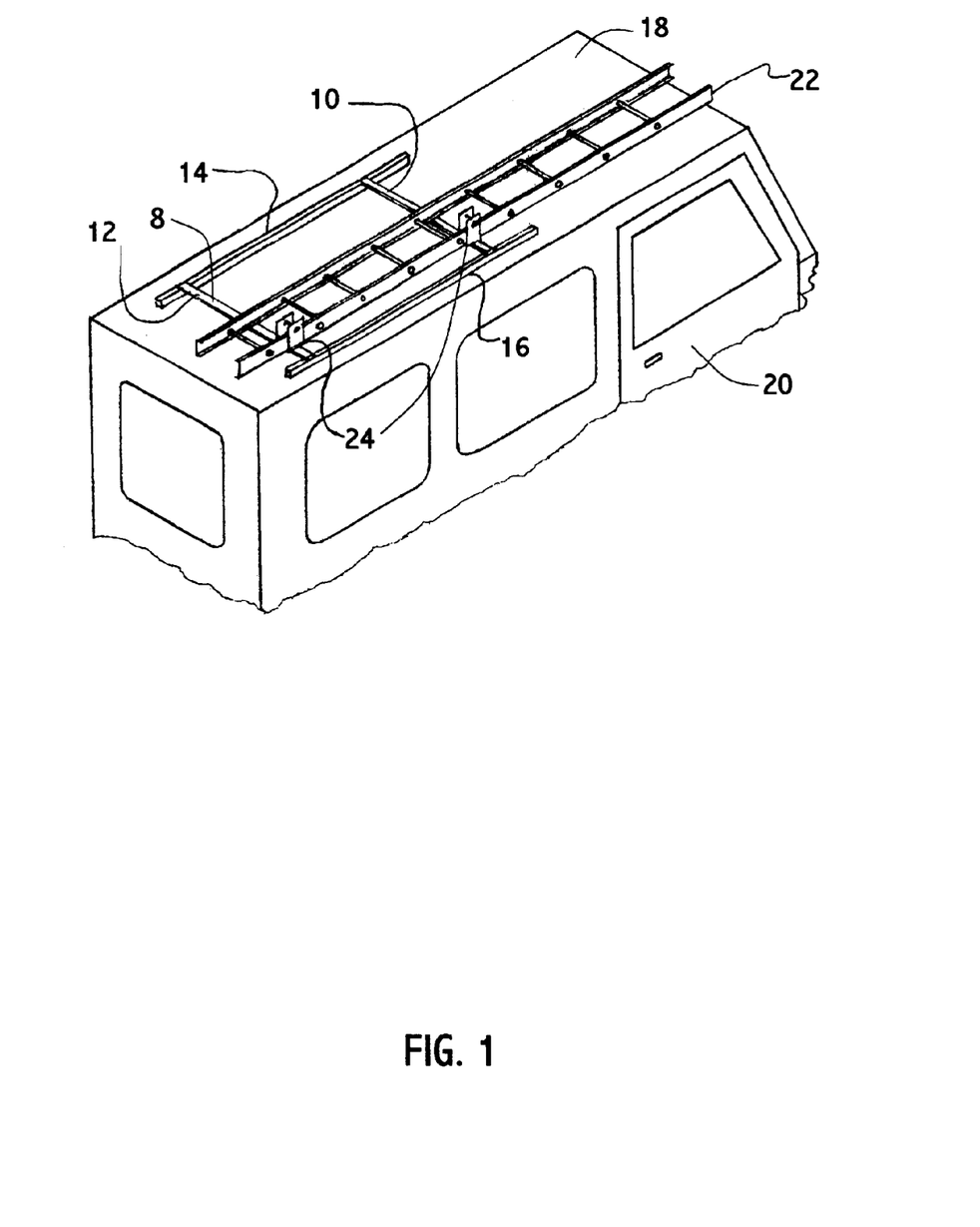
FIG. 1 shows various aspects of one embodiment of my invention using two assemblies mounted to the top of a vehicle.

Referring to FIG. 1, there is shown one embodiment of my invention in operation securely holding a ladder in position. In FIG. 1, the roof rack (8) comprises a first front mounting member (10), a second rear mounting member (12) and two side members (14) and (16). It is understood that the rack may comprise merely the front (10) and rear (12) mounting members attached to the roof (18) of the vehicle (20). The first (10) and second (12) members are mounted in a parallel spaced apart relationship across the roof of the vehicle. The side members (14) and (16) are also mounted parallel to each other lengthwise along the roof (18) of the vehicle (20). Shown in FIG. 1 is an object to be carried, in this case, a ladder (22). However, it is to be understood that my invention may secure other objects to the roof of a vehicle such as pipes and rods or similar narrow lengthy objects.

Figure 2:
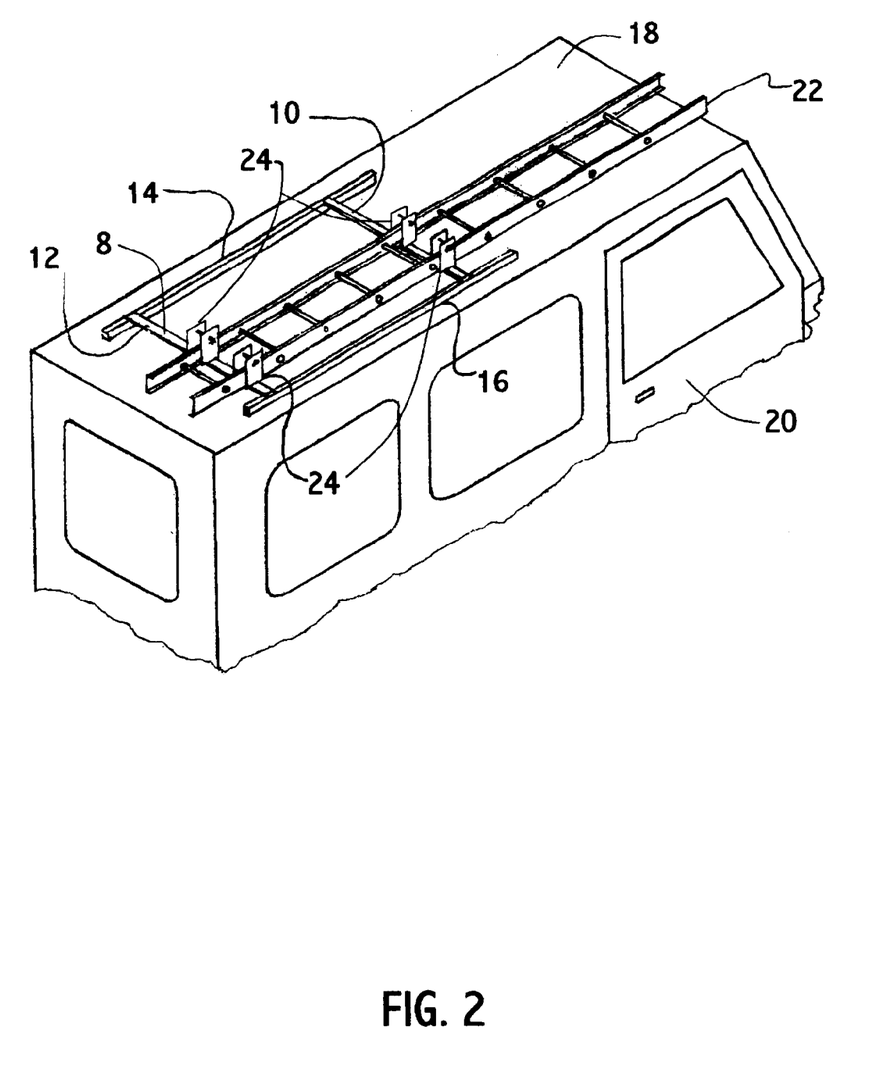
FIG. 2 shows another embodiment of my invention using more than two assemblies.

Still referring to FIG. 1, my invention comprises a plurality of releasable assemblies (24) adapted for securing an object like ladder (22) to a roof rack (8). The assemblies are releasably attached to roof rack cross members (10) and (12) as further described below. Shown in FIG. 1 is an embodiment of my invention wherein only two assemblies are shown. However, as shown in FIG. 2, there may be a plurality of assemblies (24) used to secure an object to the roof rack (8). One advantage of my invention is that all of the assemblies (24) are identical, manufactured the same way and installed on the roof rack (8) in the manner described below.

Figure 3:
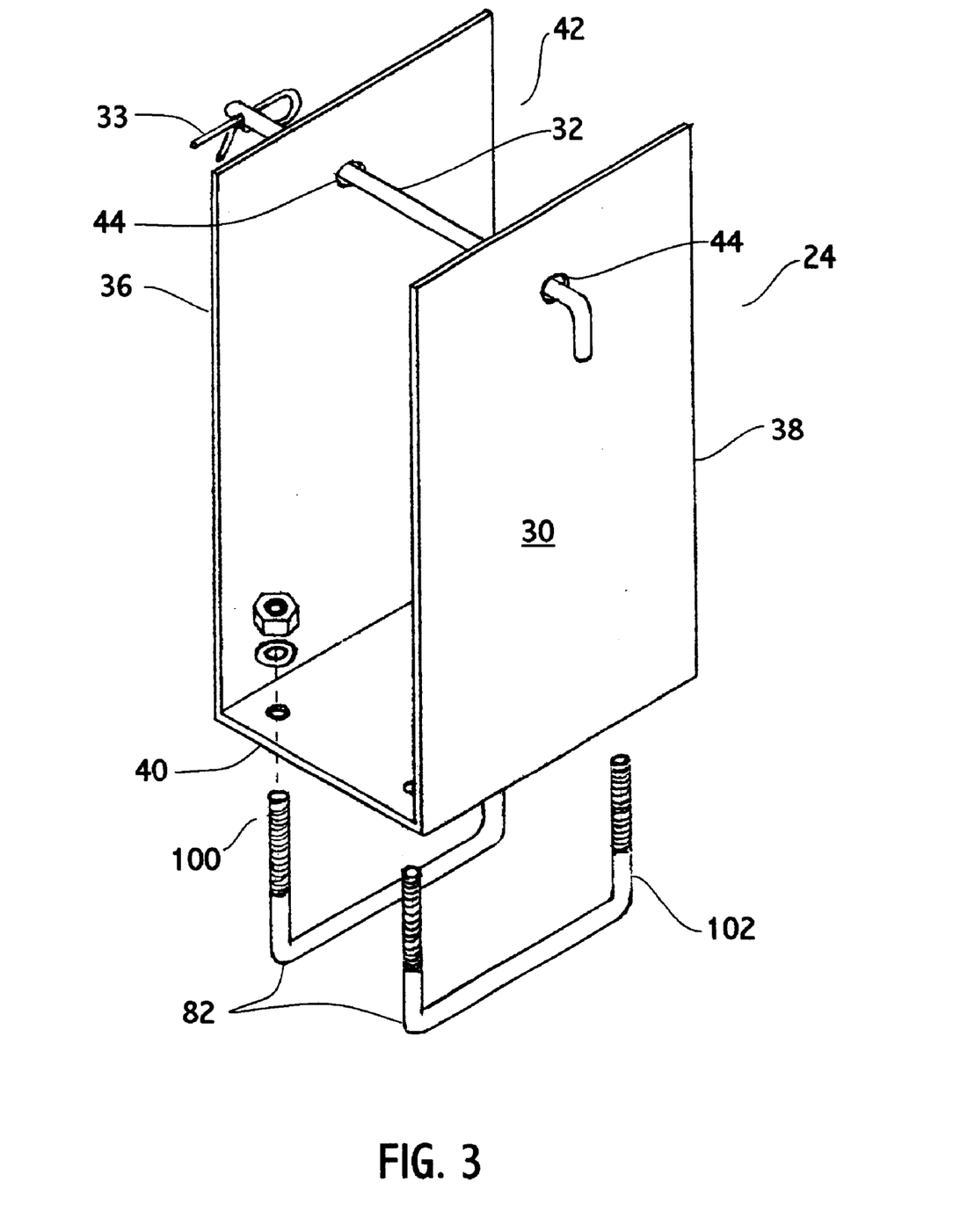
FIG. 3 shows one embodiment of an assembly of my invention.

Referring to FIG. 3 there is shown an assembly of one embodiment my invention. Each assembly (24) comprises a carrier (30) for receiving and releasably holding an object such as a ladder (22) and securing means (32) for securing the object within the carrier. Optionally included in the assembly are locking means (33) for temporarily locking said securing means (32) to the carrier (30) and the object within the carrier. The assembly also includes releasable attachment means (100) for attaching the carrier to one of the first (10) and second (12) mounting members as further described herein.

Still referring to FIG. 3, the carrier (30) is adapted to receive and hold an object. The carrier has two opposing parallel and vertical side members (36) and (38) in a spaced apart relationship. The side members are fixed to a flat bottom member (40) thereby forming a top-opened (42) channel shape. Each of the parallel and opposing sides (36) and (38) are apertured (44) to receive securing means (32). In the embodiment shown in FIG. 3, the apertures (44) are located in positional agreement to each other in the top portion of each side member (36) and (38).

Figure 4:
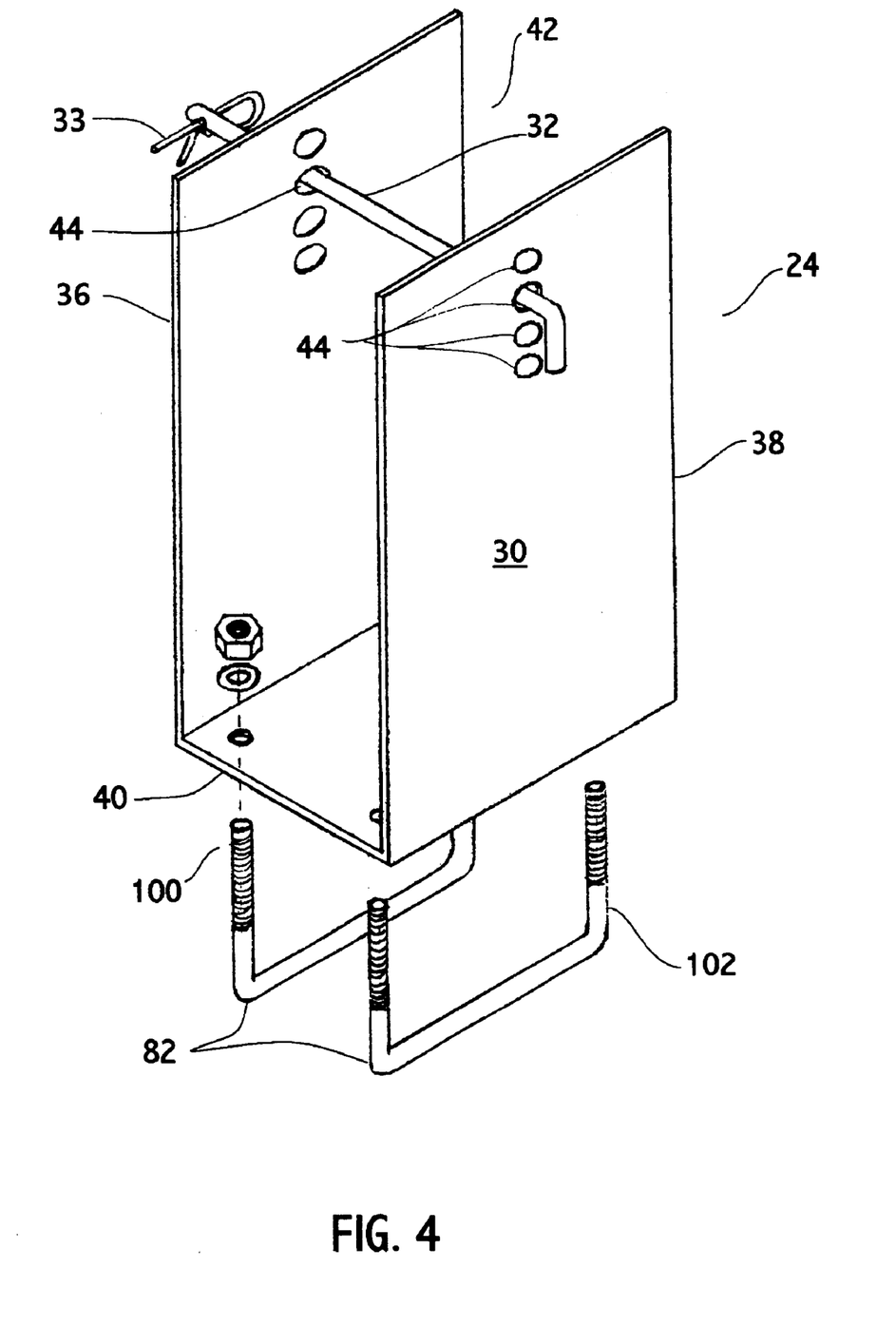
FIG. 4 shows another embodiment of an assembly of my invention.

In FIG. 4 there is another embodiment of my invention wherein each of the parallel and opposing sides (36) and (38) have a plurality of identical apertures (44) in vertical alignment and in positional agreement to each other so that securing means (32) may be received in any two opposite apertures thereby allowing the vertical height of the object held in the carrier (30) to be variable within the height of the carrier side members.

Figure 5A:
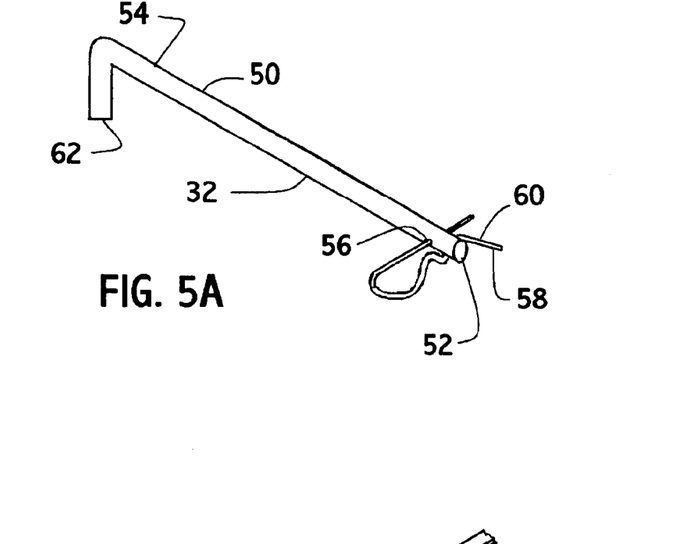
FIG. 5 shows securing means of one embodiment of my invention.

Referring to FIG. 5, securing means (32) comprises a rod (50) having a first end (52) and a second end (54). Only the first end (52) is insertable into the apertures (44). The diameter of the rod has a diameter slightly smaller than that of the apertures. The first end (52) of the rod may be beveled.

Figure 5B:
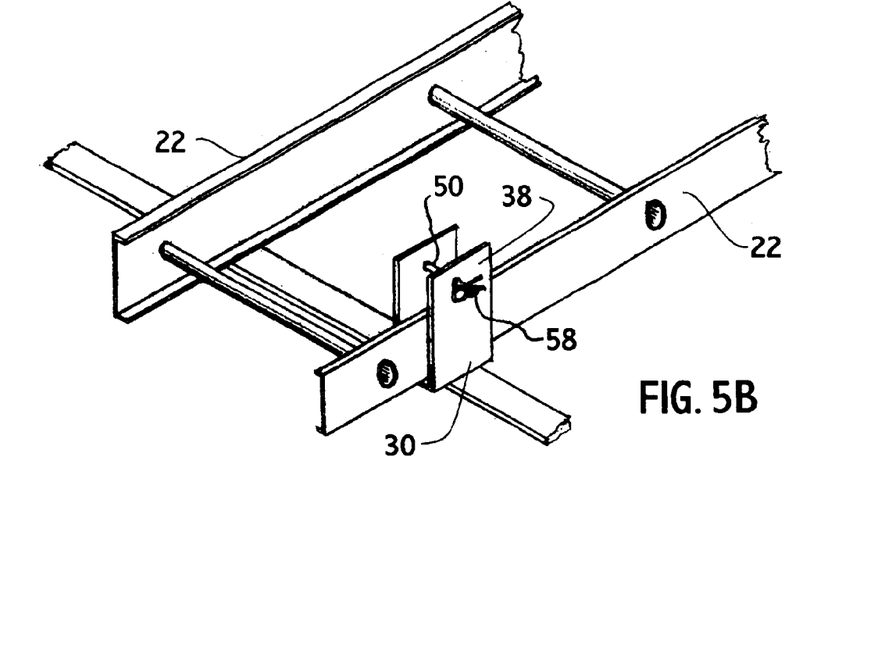

Still referring to FIG. 5, the rod first end (52) includes first temporary stop means (60) and rod second end (54) includes second permanent stop means (62) so that once the rod first end is inserted between a pair of adjacent apertures said first and second stop means operate together to substantially restrain axial movement of the rod. The axially restrained rod (50) operates to substantially restrain the vertical movement of any object (22) held within the carrier (30). In one embodiment of the invention, the first stop means comprises an aperture (56) through the diameter of the first end of the rod. The aperture adapted to receive a pin (58). In another embodiment of the invention the first stop means comprises a threaded distal portion of the first end wherein said threaded portion is adapted to receive a washer and nut. In one embodiment of my invention second stop means comprises one of a head, flange, ferrule, bushing or similar device adapted to prevent axial movement of the second end of the rod through the apertures in the vertical side member (38) of the carrier. FIG. 5B shows the securing means in operation.

Figure 6A:
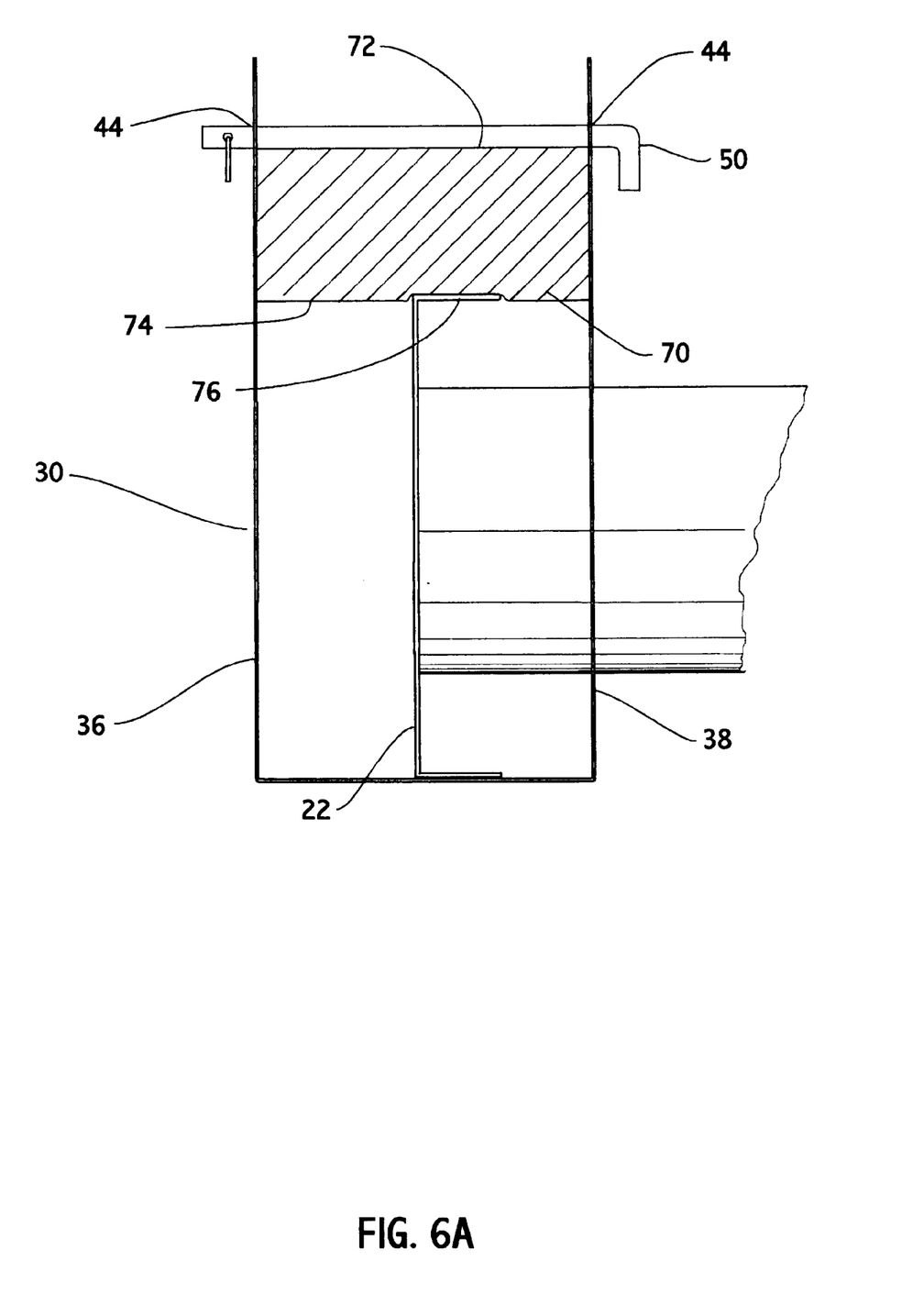
FIG. 6 shows another embodiment of my invention with a bushing member.
Figure 6B:
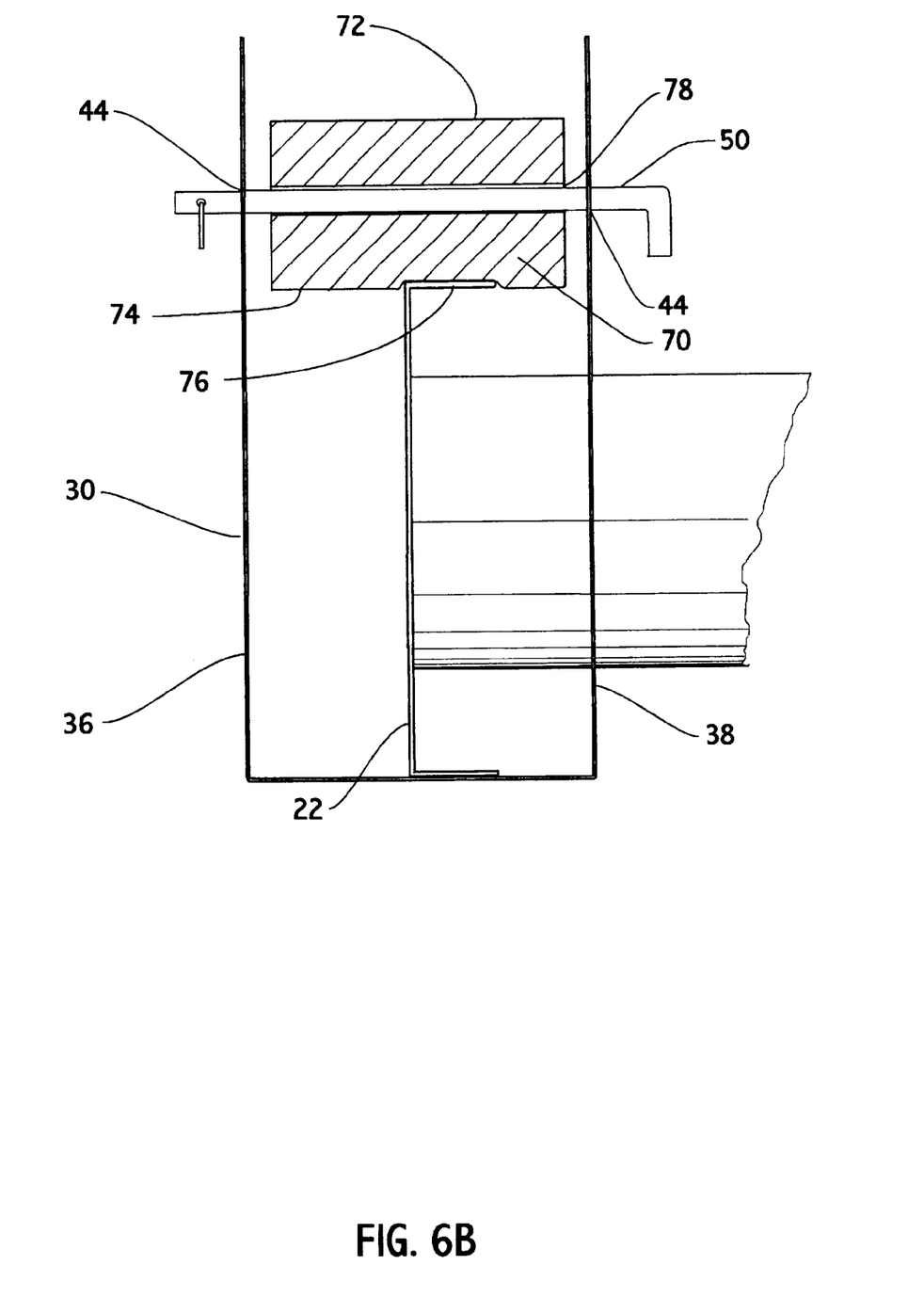

Referring to FIG. 6, and in another embodiment of my invention, there is further provided a resilient bushing (70) having a top surface (72) and a bottom surface (74). The bushing is insertably engaged in a tight sliding relationship with the parallel side members (36) and (38) of the carrier (30) so that the bottom surface (74) of the bushing (70) abuts in frictional engagement the top surface (76) of the object (22) being held within the carrier (30) and so that the top surface of the bushing (72) abuts in pressed engagement against the bottom surface of the inserted rod (50) the result being that significant lateral and vertical vibrations of the object within the carrier is dampened when the vehicle is moving thereby preventing damage to the object. Alternatively, the bushing is bored (78) with at least one bore so that when the bushing is inserted between the vertical side members of the carrier the apertures of the bushing are in alignment with the apertures (44) in the vertical side members of the carrier the result being that the rod may be inserted between the vertical side members and through the bore of the bushing thereby keeping the bushing is a secure abutting relationship with the object within the carrier. The bushing is made from a suitable material adapted to absorb vibration energy.

Figure 7:
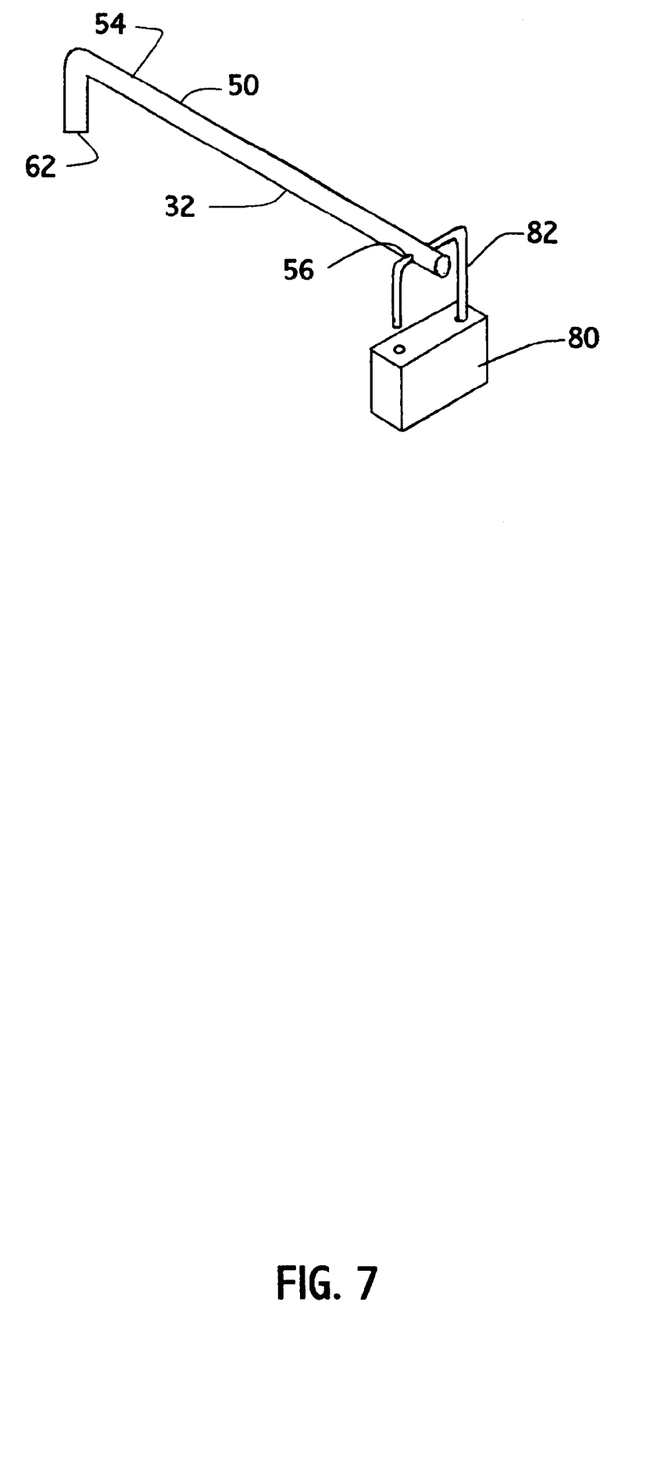
FIG. 7 shows one embodiment of the locking device of my invention.

Referring to FIG. 7, there is shown one embodiment of the locking means of my invention. The locking means comprises a locking body (80) and shackle (82) operating in combination wherein the shackle is inserted into the rod first (50) end aperture (56) in lieu of the pin and wherein the shackle is subsequently engaged and closed by said locking body.

Figure 8:
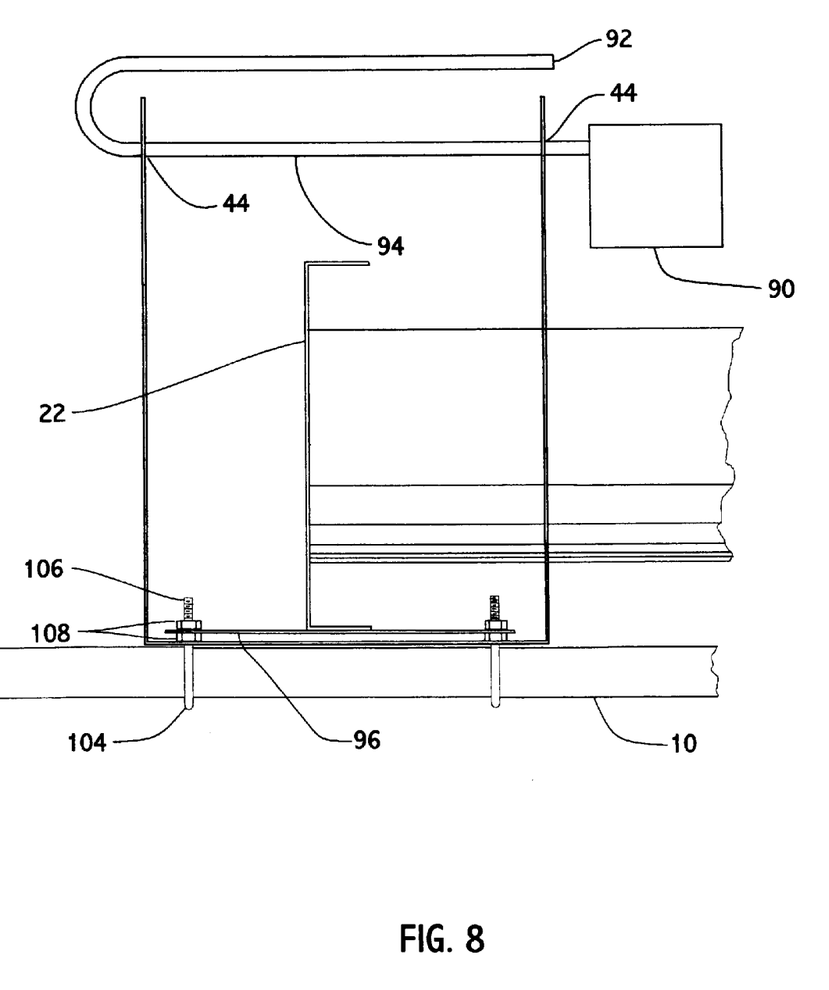
FIG. 8 shows another embodiment of the locking device of my invention.

Referring to FIG. 8, there is shown another embodiment of my invention wherein the locking means comprises a locking body (90) and shackle (92) combination wherein one arm of the shackle (94) is adapted to be received by a pair of opposing apertures (44) in the vertical side members of the carrier so that the received arm acts to restrain vertical movement of the object within the carrier and so that the shackle may be subsequently engaged and closed by said locking body. Locking plate 96 is included to ensure that the nuts (106) cannot be removed with the ladder (22) in position.

Figure 9A:
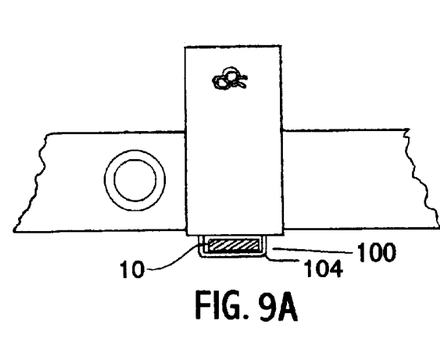
FIG. 9 shows one embodiment of how my invention is attached to the cross member of a vehicle rack.
Figure 9B:
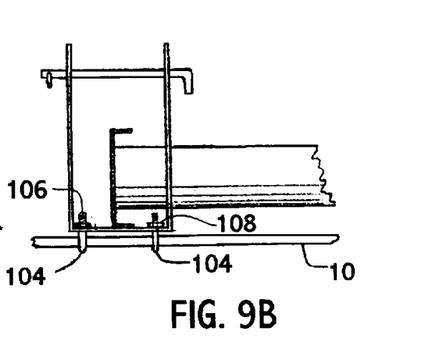
Figure 9C:
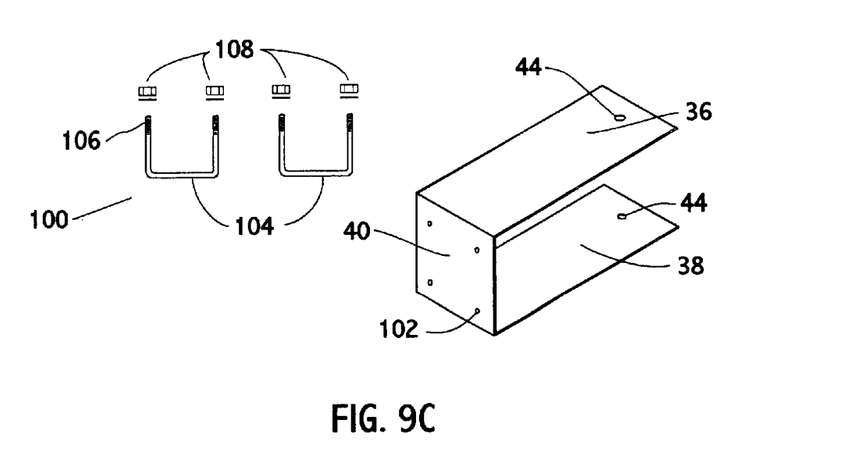

Referring to FIG. 9, there is shown one way in which the carrier is attached to the vehicle rack cross members (10) and (12). The attachment means (100) comprises at least one pair of apertures (102) located on the flat bottom member (40) said apertures in parallel alignment with the carrier side members (36) and (38) in the embodiment shown. At least one shackle bolt (104) is adapted so that the threaded ends (106) of the bolt are received by the pair of apertures (102) and further wherein the threaded ends of the bolt are adapted to receive a nut and lock washer combination (108). Other embodiments of my invention are possible whereby any suitable fastener may be used to firmly secure the carrier to the rack cross members. The shackle bolt is adapted to general cross-sectional profile of the mounting members so that when the carrier is placed on the mounting member the shackle bolt is upwardly installed around the mounting member so that the apertures in the bottom member receive the threaded ends of the bolt and so that the bolt may firmly fix the carrier to the mounting member using the nut and lock washer combination.

Although the description above contains much specificity, these should not be construed as limiting the scope of the invention but as merely providing illustrations of some of the presently preferred embodiments of this invention. Thus, the scope of the invention should be determined by the appended claims and their legal equivalents, rather than by the examples give.

What is claimed is:

1. A vehicle roof rack kit, said roof rack comprising a first front mounting member and a second rear mounting member, said first front and said second rear mounting members mounted in a parallel spaced apart relationship across the roof of said vehicle, said roof rack kit comprising at least one first carrier releasably mounted by first mounting means to the first front mounting member and at least one second carrier releasably mounted by second mounting means to the second rear mounting member, wherein said at least one first carrier and said at least one second carrier are identical, and wherein each of the at least one first carrier and at least one second carrier comprises:

a. a first and a second opposing parallel and vertical side member having a spaced apart relationship and fixed to a flat bottom member thereby forming a top-opened channel member adapted for receiving and releasably holding an object there within, said object having a top surface;

b. a plurality of identical apertures within each of the said first and said second opposing parallel and vertical side members, wherein said plurality of identical apertures are aligned vertically, and wherein the plurality of vertically aligned identical apertures within the first vertical side member are coaxially aligned with the vertically aligned identical apertures within the second vertical side member thereby forming a plurality of vertically aligned pairs of coaxial identical apertures across said top-opened channel member;

c. securing means comprising a rod having a bottom surface, a first end with temporary stop means and a second end with permanent stop means, said rod first end receivable by each pair of the plurality of vertically aligned pairs of coaxial aligned identical apertures, wherein said temporary stop means and said permanent stop means are adapted to substantially restrain axial movement of the rod once received by a pair of the plurality of vertically aligned pairs of coaxially aligned apertures, and wherein the rod is further adapted to substantially restrain the vertical movement of said object held within the top-opened channel member; and, d. a resilient bushing having a top surface and a bottom surface insertably engaged in a tight sliding relationship between the first opposing parallel and vertical side member and the second opposing parallel and vertical side member, wherein said bottom surface of the resilient bushing abuts in frictional engagement with said top surface of the object held within the top-opened channel member, and wherein said top surface of the resilient bushing abuts in pressed engagement against said bottom surface of the rod, the result being that significant lateral and vertical vibrations of the object held within the top-opened channel member are dampened when the vehicle is moving thereby preventing damage to the object.

2. The kit as claimed in claim 1 wherein the resilient bushing includes at least one horizontal bore adapted for matching the coaxial alignment of each pair of the plurality of vertically aligned pairs of coaxial aligned identical apertures across the top-opened channel member, so that when the rod is inserted between a pair of the plurality of vertically aligned pairs of coaxial apertures it may also be inserted through the at least one horizontal bore thereby keeping the resilient bushing in a secure abutting relationship with the object within the top-opened channel member.

3. The kit of claim 2 wherein the bushing is a suitable material adapted to absorb vibration energy.

4. The kit as claimed in claim 1, wherein said first mounting means and said second mounting means comprise:

a. at least one pair of apertures located on said flat bottom member, said at least one pair of apertures in parallel alignment with the first and the second opposing parallel and vertical side members; and, b. at least one shackle bolt having threaded ends adapted for receipt by the at least one pair of apertures, wherein said threaded ends are adapted for receiving at least one nut and lock washer combination.

5. The kit as claimed in claim 4 wherein said at least one shackle bolt is upwardly installed through the at least one pair of apertures located on said flat bottom member.

* * * * *